United States Patent
Lee et al.

(10) Patent No.: US 9,440,197 B2
(45) Date of Patent: *Sep. 13, 2016

(54) CROSSLINKED THERMALLY REARRANGED POLY(BENZOXAZOLE-CO-IMIDE), GAS SEPARATION MEMBRANES COMPRISING THE SAME AND PREPARATION METHOD THEREOF

(71) Applicant: IUCF-HYU (INDUSTRY-UNIVERSITY COOPERATION FOUNDATION HANYANG UNIVERSITY), Seoul (KR)

(72) Inventors: Young Moo Lee, Seoul (KR); Mariola Calle, Seoul (KR)

(73) Assignee: ICUF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/319,798

(22) Filed: Jun. 30, 2014

(65) Prior Publication Data

US 2015/0000528 A1   Jan. 1, 2015

(30) Foreign Application Priority Data

Jul. 1, 2013 (KR) .................. 10-2013-0076521
Nov. 15, 2013 (KR) .................. 10-2013-0139216

(51) Int. Cl.

| | | |
|---|---|---|
| B01D 53/22 | (2006.01) | |
| B01D 71/64 | (2006.01) | |
| B01D 67/00 | (2006.01) | |
| C08G 73/22 | (2006.01) | |
| B01D 71/62 | (2006.01) | |
| C08G 73/10 | (2006.01) | |

(52) U.S. Cl.
CPC ............ B01D 71/64 (2013.01); B01D 53/228 (2013.01); B01D 67/0006 (2013.01); B01D 71/62 (2013.01); C08G 73/1039 (2013.01); B01D 2256/245 (2013.01); B01D 2257/504 (2013.01); B01D 2258/0283 (2013.01); B01D 2323/30 (2013.01); Y02C 10/10 (2013.01); Y02C 20/20 (2013.01); Y02P 20/152 (2015.11)

(58) Field of Classification Search
CPC B01D 53/228; B01D 67/0006; B01D 71/62; B01D 71/64; B01D 2053/221; B01D 2323/30; C08G 73/1039; B29D 99/005; B29C 39/003; B29K 2479/08; B29L 2031/755
USPC ..................... 95/51; 96/12, 13, 14
See application file for complete search history.

(56) References Cited

U.S. PATENT DOCUMENTS

| | | | | | |
|---|---|---|---|---|---|
| 4,087,409 | A * | 5/1978 | Preston | .................. | C08G 73/06 528/229 |
| 2003/0126990 | A1* | 7/2003 | Koros | .................. | B01D 53/228 96/10 |
| 2009/0165645 | A1* | 7/2009 | Wind | ..................... | B01D 53/22 95/51 |
| 2009/0297850 | A1* | 12/2009 | Jung | ..................... | B01D 53/22 96/10 |
| 2010/0133190 | A1 | 6/2010 | Liu et al. | | |
| 2010/0242723 | A1* | 9/2010 | Liu | ........................ | B01D 71/64 95/51 |
| 2011/0009506 | A1* | 1/2011 | Lee | ....................... | B01D 53/228 521/27 |
| 2012/0305484 | A1 | 12/2012 | Freeman et al. | | |
| 2015/0094429 | A1* | 4/2015 | Liu | .................... | B01D 67/0006 525/431 |

FOREIGN PATENT DOCUMENTS

| | | |
|---|---|---|
| JP | 2011523683 | 8/2011 |
| WO | 2010/110975 | 9/2010 |

OTHER PUBLICATIONS

Jung, Chul Ho et al., "Highly permeable and selective poly(benzoxazole-co-imide) membranes for gas separation", Journal of Membrane Science, Jan. 2010, 350, pp. 301-309.*
Omole, Imona C., "Increased Molecular Weight of a Cross-Linkable Polyimide for Spinning Plasticization Resistant Hollow Fiber Membranes," Macromolecules, 2008, vol. 41, pp. 6367-6375.
Park, Ho Bum, et al., "Polymers with Cavities Tuned for Fast Selective Transport of Small Molecules and Ions," Science, 2007, vol. 318, pp. 254-258.

* cited by examiner

Primary Examiner — Jason M Greene
(74) Attorney, Agent, or Firm — Duane Morris LLP; J. Rodman Steele, Jr.; Gregory M. Lefkowitz

(57) ABSTRACT

Provided is a crosslinked thermally rearranged poly(benzoxazole-co-imide) obtained through the transesterification crosslinking of an ortho-hydroxy polyimide copolymer and a diol compound, followed by thermal rearrangement, a gas separation membrane (excluding a membrane for flue gas separation), and a method for preparing the same. The crosslinked thermally rearranged poly(benzoxazole-co-imide) according to the present invention allows less packing of polymer chains and has a structure with a larger space, and thus shows increased possibility of permeation and diffusion of small molecules therethrough. In addition, the gas separation membrane (with the proviso that a membrane for use in flue gas separation is excluded) including the crosslinked thermally rearranged poly(benzoxazole-co-imide) according to the present invention has excellent gas permeability and selectivity, and particularly shows gas separation quality in terms of carbon dioxide/methane separation corresponding to a level exceeding the so-called 2008 upper bound.

21 Claims, 9 Drawing Sheets

CROSSLINKED THERMALLY REARRANGED POLY(BENZOXAZOLE-CO-IMIDE), GAS SEPARATION MEMBRANES COMPRISING THE SAME AND PREPARATION METHOD THEREOF

CROSS-REFERENCE TO RELATED APPLICATIONS

This application is claims priority to South Korean Patent Application No. 10-2013-0076521 filed Jul. 1, 2013 and South Korean Patent Application No. 10-2103-0139216 filed Nov. 15, 2013, the entire contents of which are incorporated herein by reference.

TECHNICAL FIELD

The following disclosure relates to a crosslinked thermally rearranged poly(benzoxazole-co-imide), a gas separation membrane including the same and a method for preparing the same. More particularly, the following disclosure relates to a crosslinked thermally rearranged poly(benzoxazole-co-imide), obtained by transesterification crosslinking between an ortho-hydroxy polyimide copolymer and a did compound followed by thermal rearrangement, a gas separation membrane including the same, and a method for preparing the same

BACKGROUND

Recently, gas separation based on the use of a membrane has been spotlighted as separation technology growing rapidly in response to the importance thereof. Gas separation using such a membrane has many advantages, including low energy consumption and operation cost and high processing utility, as compared to the conventional separation processes. Particularly, since 1980's, many fundamental studies using organic polymer membranes have been conducted. However, such conventional polymers generally impart efficient packing in a polymer chain space with little micropores present therein, and thus show relatively low mass transferability.

On the other hand, polymers having a high degree of free volume and known as microporous organic polymers have improved diffusibility in addition to adsorbability to small gas molecules, and thus have given many attentions as one of the prominent candidates useful for separation processes. Therefore, active studies have been conducted to develop organic polymers that can be used as gas separation membranes by focusing on the fact that a specific microporous polymer based on a rigid ladder-shaped structure having a twisted region inhibiting efficient packing in a polymer chain space provides relatively high gas permeability and selectivity.

Among such studies, many attempts have been made to apply rigid vitrified proaromatic organic polymers, such as polybenzoxazole, polybenzimidazole or polybenzthiazole, having excellent thermal, mechanical and chemical properties as gas separation membranes. However, most of the above organic polymers are hardly soluble in general organic solvents, and thus have difficulty in preparing membranes through a simple and practical solvent casting process. Under these circumstances, to overcome such difficulty, the inventors of the present invention have recently reported that a polybenzoxazole membrane obtained through a thermal rearrangement process of polyimide having a hydroxyl group at the ortho position provides a carbon dioxide permeability 10-100 times higher than the carbon dioxide permeability of the conventional polybenzoxazole membrane obtained by a solvent casting process. However, in this case, there is still a room for improvement in that the carbon dioxide/methane ($CO_2/CH_4$) selectivity is equal to that of the commercially available cellulose acetate membrane (Non-patent Document 1).

In order to improve the selectivity of a polybenzoxazole membrane, it has been also reported that a polybenzoxazole membrane obtained by thermal rearrangement of a membrane of a ortho-hydroxyl group-containing polyimide/poly (styrenesulfonic acid) blend at 300-650° C. provides a carbon dioxide/methane ($CO_2/CH_4$) selectivity improved by at most 95% as compared to a polybenzoxazole membrane obtained by thermal rearrangement of hydroxypolyimide containing no poly(styrenesulfonic acid). However, in this case, there is no disclosure about a method for preparing a polyimide used as a precursor for the preparation of the polybenzoxazole membrane. Thus, there is a problem in that no consideration is made about variations in the free volume factor and gas separation quality of a polybenzoxazole membrane rearranged thermally from a polyimide precursor depending on imidization methods of hydroxypolyimide, i.e., solution thermal imidization, azeotropic thermal imidization, solid state thermal imidization and chemical imidization (Patent Document 1).

Thus, based on the fact that the properties of a thermally arranged polybenzoxazole is affected by the method for preparing an aromatic polyimide, it has been reported that polybenzoxazole membranes are obtained by providing ortho-hydroxyl group-containing polyimides through various processes, such as solution thermal imidization, solid state thermal imidization and chemical imidization, and then carrying out thermal rearrangement thereof. However, the resultant membranes having high separation quality due to a specific porous structure derived from thermal rearrangement may be applied merely to separation membranes for removing water from ethanol or other organic solvents. Moreover, there is no suggestion about the quality as gas separation membranes (Patent Document 2).

Further, it has been reported that a crosslinked polybenzoxazole membrane obtained by providing ortho-hydroxyl group-containing polyimide through chemical imidization, carrying out thermal rearrangement thereof to obtain a polybenzoxazole membrane, and then subjecting the membrane to UV irradiation shows improved selectivity. However, in this case, since polyimide is obtained through chemical imidization, thermal imidization is omitted and the polybenzoxazole membrane rearranged thermally from the polyimide still has relatively low carbon dioxide permeability even though it has a crosslinked structure. Moreover, a UV irradiation system is required to form such a crosslinked structure, resulting in degradation of processability (Patent document 3).

Under these circumstances, the inventors of the present invention have focused on the fact that the gas transport behavior of a thermally rearranged polybenzoxazole depends on the imidization method of its precursor, polyimide, and the crosslinked structure of polybenzoxazole. Thus, the inventors have thought that a crosslinked polybenzoxazole membrane obtained by providing hydroxypolyimide having a hydroxyl group at the ortho position through solution thermal imidization, subjecting the resultant hydroxypolyimide to chemical crosslinking to form a crosslinked hydroxypolyimide membrane before the thermal rearrangement for forming polybenzoxazole, and then finally carrying out thermal rearrangement can improve the separation quality as a gas separation membrane significantly. The present invention is based on this thought.

REFERENCES

Patent Documents

Patent Document 1: Korean Laid-Open Patent No. 10-2012-0100920
Patent Document 2: US Patent Publication No. 2012/0305484
Patent Document 3: Japanese Patent Publication No. 2012-521871

Non-Patent Document

Non-Patent Document 1: Y. M Lee et al., Science 318, 254-258 (2007)

SUMMARY

An embodiment of the present invention is directed to providing a novel crosslinked thermally rearranged poly(benzoxazole-co-imide) obtained by transesterification crosslinking between an ortho-hydroxy polyimide copolymer and a diol compound followed by thermal rearrangement, a gas separation membrane including the same, and a method for preparing the same.

In one general aspect, there is provided a crosslinked thermally rearranged poly(benzoxazole-coimide) having a repeating unit represented by the following Chemical Formula 1:

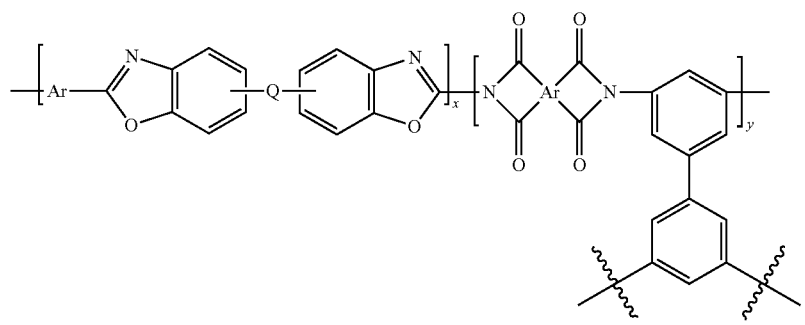

<Chemical Formula 1>

(In Chemical Formula 1, Ar is an aromatic cyclic group selected from substituted or non-substituted tetravalent C6-C24 arylene groups and substituted or non-substituted tetravalent C4-C24 heterocyclic groups, wherein the aromatic cyclic group is present alone; two or more of the aromatic cyclic groups form a condensed ring together; two or more of the aromatic cyclic groups are linked to each other via O, S, CO, $SO_2$, $Si(CH_3)_2$, $(CH_2)_p$ ($1 \leq P \leq 10$), $(CF_2)_q$ ($1 \leq q \leq 10$), $C(CH_3)_2$, $C(CF_3)_2$ or CO—NH, Q is a single bond; or O, S, CO, $SO_2$, $Si(CH_3)_2$, $(CH_2)_p$ ($1 \leq P \leq 10$), $(CF_2)_q$ ($1 \leq q \leq 10$), $C(CH_3)_2$, $C(CF_3)_2$, CO—NH, $C(CH_3)(CF_3)$, or a substituted or non-substituted phenylene group, and each of x and y represents a molar fraction in the repeating unit, wherein $0.8 \leq x \leq 0.95$, $0.05 \leq y \leq 0.2$ and $x+y=1$).

According to an embodiment, the crosslinked thermally rearranged poly(benzoxazole-co-imide) may have an interplanar spacing (d-spacing) of 0.62-0.67 nm.

According to another embodiment, the crosslinked thermally rearranged poly(benzoxazole-co-imide) may have a density of 1.36-1.43 g/cm³.

In another general aspect, there is provided a method for preparing a crosslinked thermally rearranged poly(benzoxazole-co-imide) having a repeating unit represented by the above Chemical Formula 1, the method including the steps of:

i) reacting an add dianhydride, ortho-hydroxydiamine and 3,5-diaminobenzoic add as comonomer to obtain polyamic acid solution, and subjecting the polyamic acid solution to azeotropic thermal imidization to provide an ortho-hydroxypolyimide copolymer having a carboxylic acid;

ii) reacting the polyimide copolymer of step i) with a did to obtain a monoesterified ortho-hydroxypolyimide copolymer;

iii) subjecting the monoesterified ortho-hydroxypolyimide copolymer of step ii) to transesterification crosslinking to obtain a crosslinked ortho-hydroxypolyimide copolymer; and iv) carrying out thermal rearrangement of the crosslinked ortho-hydroxypolyimide copolymer of step iii).

According to an embodiment, the acid dianhydride used in step i) is represented by the following Chemical Formula 2:

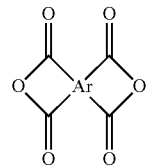

<Chemical Formula 2>

(In Chemical Formula 2, Ar is the same as defined in Chemical Formula 1).

According to another embodiment, the ortho-hydroxydiamine used in step i) is represented by the following Chemical Formula 3:

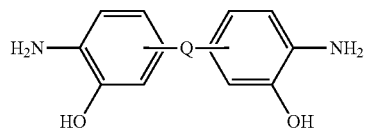

<Chemical Formula 3>

(In Chemical Formula 3, Q is the same as defined in Chemical Formula 1).

According to still another embodiment, the azeotropic thermal imidization of step i) is carried out by adding toluene or xylene to the polyamic acid solution and agitating the reaction mixture to perform imidization at 180-200° C. for 6-12 hours.

According to still another embodiment, the diol used in step ii) is any one selected from the group consisting of ethylene glycol, propylene glycol, 1,4-butylene glycol, 1,3-propanediol, 1,2-butanediol, 1,3-butanediol, and benzenedimethanol.

According to still another embodiment, the monoesterification of step ii) is carried out by reacting the copolymer of step i) with an excessive amount of diol corresponding to at least 50 times of the equivalent of carboxylic acid contained in the copolymer at 140-160° C. for 18-24 hours in the presence of a para-toluenesulfonic acid catalyst.

According to still another embodiment, the transesterification crosslinking of step iii) is carried out through heat treatment at 200-250° C. for 18-24 hours under vacuum.

According to yet another embodiment, the thermal rearrangement of step iv) is carried out by warming the crosslinked ortho-hydroxy polyimide copolymer to 350-450° C. at a heating rate of 1-20° C./min under highly pure inert gas atmosphere and maintaining an isothermal state for 0.1-3 hours.

In still another general aspect, there is provided a gas separation membrane (with the proviso that a membrane for use in flue gas separation is excluded) including a crosslinked thermally rearranged poly(benzoxazole-co-imide) having a repeating unit represented by the above Chemical Formula 1.

According to an embodiment, the membrane may have a $d_3$ average pore diameter of 4.0 Å and a $d_4$ average pore diameter of 8.6 Å.

In yet another general aspect, there is provided a method for preparing a gas separation membrane (with the proviso that a membrane for use in flue gas separation is excluded) including a crosslinked thermally rearranged poly(benzoxazole-co-imide) having a repeating unit represented by the above Chemical Formula 1, the method including the steps of:

i) reacting an acid dianhydride, ortho-hydroxydiamine and 3,5-diaminobenzoic acid as comonomer to obtain polyamic acid solution, and subjecting the polyamic acid solution to azeotropic thermal imidization to provide an ortho-hydroxypolyimide copolymer having a carboxylic acid;

ii) reacting the polyimide copolymer of step i) with a diol to obtain a monoesterified ortho-hydroxypolyimide copolymer;

iii) casting a polymer solution containing the monoesterified ortho-hydroxypolyimide copolymer of step ii) dissolved in an organic solvent to form a membrane, which in turn is subjected to transesterification crosslinking to obtain a crosslinked ortho-hydroxypolyimide copolymer membrane; and iv) carrying out thermal rearrangement of the crosslinked ortho-hydroxypolyimide copolymer membrane of step iii).

According to an embodiment, the acid dianhydride used in step i) is represented by the following Chemical Formula 2:

<Chemical Formula 2>

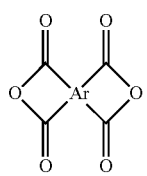

(In Chemical Formula 2, Ar is the same as defined in Chemical Formula 1).

According to another embodiment, the ortho-hydroxydiamine used in step i) is represented by the following Chemical Formula 3:

<Chemical Formula 3>

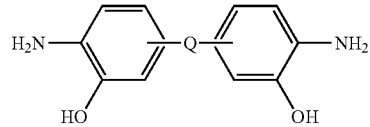

(In Chemical Formula 3. Q is the same as defined in Chemical Formula 1).

According to still another embodiment, the azeotropic thermal imidization of step i) is carried out by adding toluene or xylene to the polyamic acid solution and agitating the reaction mixture to perform imidization at 180-200° C. for 6-12 hours.

According to still another embodiment, the diol used in step ii) is any one selected from the group consisting of ethylene glycol, propylene glycol, 1,4-butylene glycol, 1,3-propanediol, 1,2-butanediol, 1,3-butanediol, and benzenedimethanol.

According to still another embodiment, the monoesterification of step ii) is carried out by reacting the copolymer of step i) with an excessive amount of diol corresponding to at least 50 times of the equivalent of carboxylic acid contained in the copolymer at 140-160° C. for 18-24 hours in the presence of a para-toluenesulfonic acid catalyst.

According to still another embodiment, the transesterification crosslinking of step iii) is carried out through heat treatment at 200-250° C. for 18-24 hours under vacuum.

According to yet another embodiment, the thermal rearrangement of step iv) is carried out by warming the membrane to 350-450° C. at a heating rate of 1-20° C./min under highly pure inert gas atmosphere and maintaining an isothermal state for 0.1-3 hours.

The novel crosslinked thermally rearranged poly(benzoxazole-co-imide) according to the present invention allows less packing of polymer chains and has a structure with a larger space, and thus shows increased possibilty of permeation and diffusion of small molecules therethrough. In addition, the gas separation membrane (with the proviso that a membrane for use in flue gas separation is excluded) including the novel crosslinked thermally rearranged poly(benzoxazole-co-imide) according to the present invention has excellent gas permeability and selectivity, and particularly shows gas separation quality in terms of carbon dioxide/methane separation corresponding to a level exceeding the so-called 2008 upper bound.

DETAILED DESCRIPTION OF EMBODIMENTS

Figure 1:
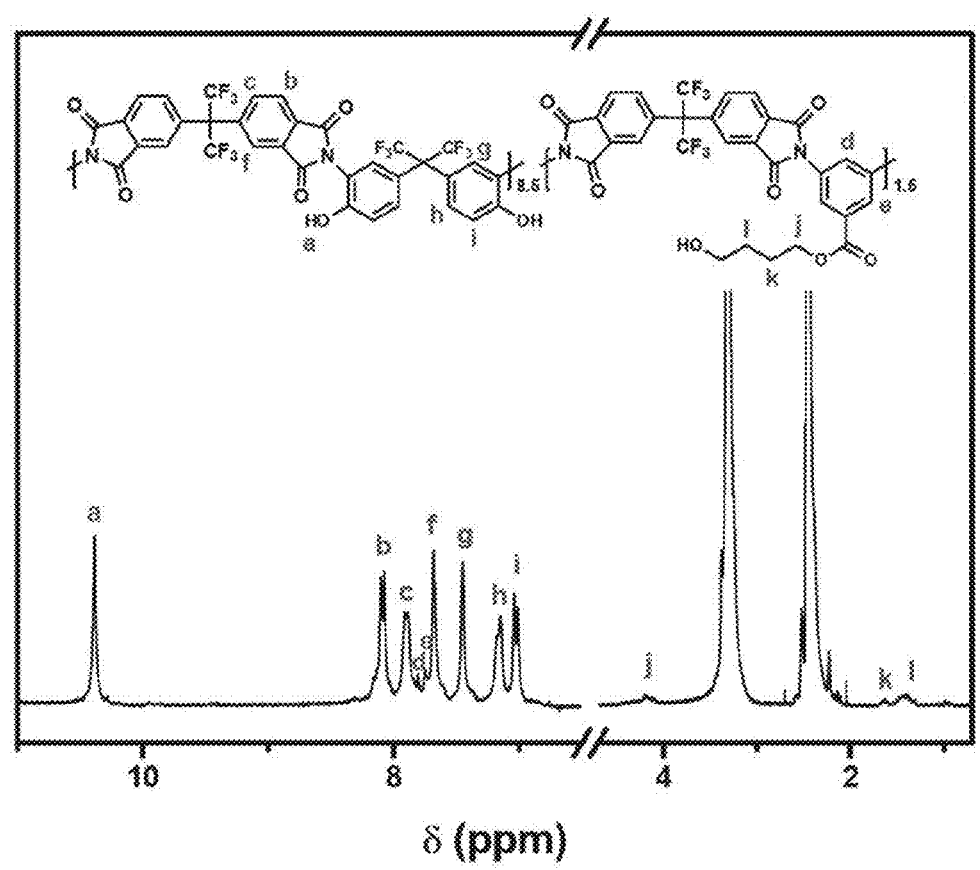
FIG. 1 shows a $^1$H-NMR (Nuclear Magnetic Resonance) spectrum of HPIBG-15 obtained according to Example 2.

The advantages, features and aspects of the present invention will become apparent from the following description of the embodiments with reference to the accompanying drawings, which is set forth hereinafter.

In one aspect, there is provided a crosslinked thermally rearranged poly(benzoxazole-co-imide) having a repeating unit represented by the following Chemical Formula 1:

each of x and y represents a molar fraction in the repeating unit, wherein $0.8 \leq x \leq 0.95$, $0.05 \leq y \leq 0.2$ and $x+y=1$).

The structure of the poly(benzoxazole-co-imide) represented by Chemical Formula 1 is based on the synthesis of polyimide obtained by imidization of polyamic acid prepared from the reaction between an acid dianhydride and diamine. In addition, as shown in the y-side structural unit of Chemical Formula 1, it is required to provide the structure of a polyimide copolymer derived from a diamine compound having a functional group such as carboxylic acid in order for the compound of Chemical Formula 1 to have a chemically covalently bound crosslinked structure. In addition, thermally rearranged polybenzoxazole is obtained by forming an intermediate having a carboxy-benzoxazole structure through the attack of a functional group, such as hydroxyl, present at the ortho-position of the linking aromatic imide ring against the carbonyl group of imide ring, followed by decarboxylation caused by heat treatment. Thus, according to the method disclosed herein, a crosslinked thermally rearranged poly(benzoxazole-co-imide) having a repeating unit represented by Chemical Formula 1 is obtained by way of the multi-step synthetic pathway as described hereinafter.

That is, in another aspect, there is provided a method for preparing a crosslinked thermally rearranged poly(benzoxazole-co-imide) having a repeating unit represented by the above Chemical Formula 1, the method including the steps of:

i) reacting an acid dianhydride, ortho-hydroxydiamine and 3,5-diaminobenzoic acid as comonomer to obtain polyamic acid solution, and subjecting the polyamic acid solution to azeotropic thermal imidization to provide an ortho-hydroxypolyimide copolymer having a carboxylic acid;

<Chemical Formula 1>

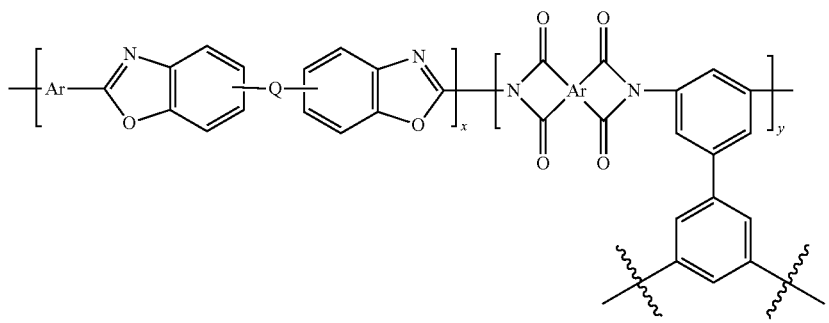

(In Chemical Formula 1, Ar is an aromatic cyclic group selected from substituted or non-substituted tetravalent C6-C24 arylene groups and substituted or non-substituted tetravalent C4-C24 heterocyclic groups, wherein the aromatic cyclic group is present alone; two or more of the aromatic cyclic groups form a condensed ring together; two or more of the aromatic cyclic groups are linked to each other via O, S, CO, $SO_2$, $Si(CH_3)_2$, $(CH_2)_p$ ($1 \leq P \leq 10$), $(CF_2)_q$ ($1 \leq q \leq 10$), $C(CH_3)_2$, $C(CF_3)_2$ or CO—NH, Q is a single bond; or O, S, CO, $SO_2$, $Si(CH_3)_2$, $(CH_2)_p$ ($1 \leq P \leq 10$), $(CF_2)_q$ ($1 \leq q \leq 10$), $C(CH_3)_2$, $C(CF_3)_2$, CO—NH, $C(CH_3)(CF_3)$, or a substituted or non-substituted phenylene group, and ii) reacting the polyimide copolymer of step i) with a diol to obtain a monoesterified ortho-hydroxypolyimide copolymer;

iii) subjecting the monoesterified ortho-hydroxypolyimide copolymer of step ii) to transesterification crosslinking to obtain a crosslinked ortho-hydroxypolyimide copolymer; and iv) carrying out thermal rearrangement of the crosslinked ortho-hydroxypolyimide copolymer of step iii).

In general, it is required to react an acid dianhydride with diamine to obtain polyamic acid first in order to obtain polyimide. Thus, the method disclosed herein uses a compound represented by the following Chemical Formula 2 as an acid dianhydride:

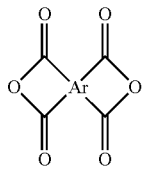

<Chemical Formula 2>

(In Chemical Formula 2, Ar is the same as defined in Chemical Formula 1).

Any compound represented by Chemical Formula 2 may be used as a monomer for preparing polyimide with no particular limitation. However, it is preferred to use 4,4'-hexafluoroisoproylidene phthalic dianhydride (6FDA) having a fluoride group in view of further improvement of the thermal and chemical properties of the resultant polyimide.

In addition, the target product of the method disclosed herein has a poly(benzoxazole-co-imide) structure. Thus, based on the fact that thermal rearrangement of ortho-hydroxy polyimide results in introduction of a polybenzoxazole unit, a compound represented by the following Chemical Formula 3 is used as ortho-hydroxydiamine to obtain ortho-hydroxy polyimide:

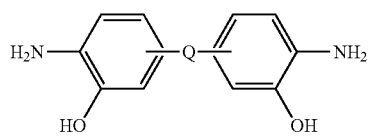

<Chemical Formula 3>

(In Chemical Formula 3, is the same as defined in Chemical Formula 1).

Any compound represented by Chemical Formula 3 may be used as ortho-hydroxydaimine. However, it is preferred to use 2,2-bis(3-amino-4-hydroxyphenyl)hexafluoropropane (bisAPAF) having a fluoride group in view of further improvement of the thermal and chemical properties of the resultant polyimide.

In addition, according to the method disclosed herein, 3,5-diaminobenzoic acid is used as comonomer and allowed to react with the acid dianhydride of Chemical Formula 2 and ortho-hydroxy diamine of Chemical Formula 3 to provide an ortho-hydroxy polyimide copolymer having a carboxylic acid.

In other words, in step i), the acid dianhydride of Chemical Formula 2, ortho-hydroxy diamine of Chemical Formula 3 and 3,5-diaminobenzoic acid are dissolved and agitated in an organic solvent such as N-methylpyrrolidone (NMP) to obtain polyamic acid solution, which in turn is subjected to azeotropic thermal imidization to obtain an ortho-hydroxy polyimide copolymer having an carboxylic acid represented by the following General Formula 1:

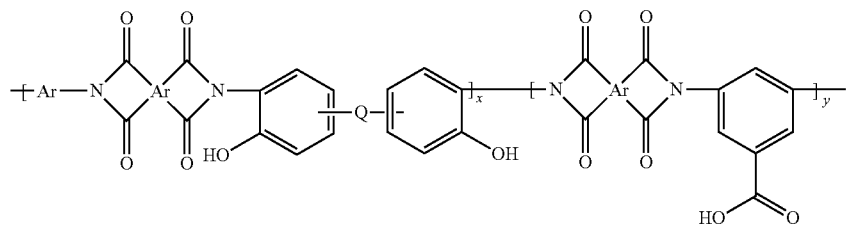

<General Formula 1>

(In General Formula 1, Ar, Q, x and y are the same as defined in Chemical Formula 1).

Herein, the azeotropic thermal imidization is carried out by adding toluene or xylene to polyamic acid solution and agitating the reaction mixture to perform imidization at 180-200° C. for 6-12 hours. During the imidization, the water released while the imide ring is formed is separated as an azeotropic mixture of toluene or xylene.

Then, the polyimide copolymer of step i) is reacted with diol to obtain a monoesterified ortho-hydroxy polyimide copolymer represented by the following General Formula 2:

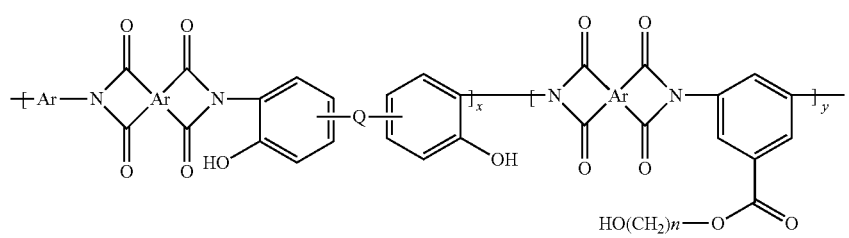

<General Formula 2>

(In General Formula 2, Ar, Q, x and y are the same as defined in Chemical Formula 1).

Herein, any one selected from the group consisting of ethylene glycol, propylene glycol, 1,4-butylene glycol, 1,3-propanediol, 1,2-butanediol, 1,3-butanediol, and benzenedimethanol may be used as did, and 1,4-butylene glycol is more preferred but is not limited thereto.

Then, the monoesterification of step ii) is carried out by reacting the copolymer of step i) with an excessive amount of diol corresponding to at least 50 times of the equivalent of carboxylic acid contained in the copolymer at 140-160° C. for 18-24 hours in the presence of a para-toluenesulfonic acid catalyst.

Then, the monoesterified ortho-hydroxypolyimide copolymer (General Formula 2) of step ii) is subjected to transesterification crosslinking to obtain a crosslinked ortho-hydroxypolyimide copolymer represented by the following General Formula 3:

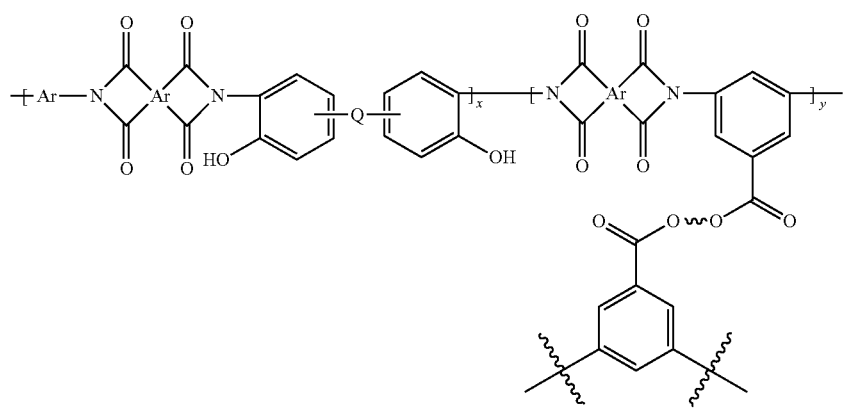

<General Formula 3>

(In General Formula 3, Ar, Q, x and y are the same as defined in Chemical Formula 1).

To carry out the transesterification crosslinking, the copolymer is heat treated at 200-250° C. for 18-24 hours under vacuum.

Finally, the crosslinked ortho-hydroxypolyimide copolymer represented by the following General Formula 3 is subjected to thermal rearrangement, thereby providing a crosslinked thermally rearranged poly(benzoxazole-co-imide represented by Chemical Formula 1 as a final target product.

The thermal rearrangement is carried out by warming the membrane to 350-450° C. at a heating rate of 1-20° C./rain under highly pure inert gas atmosphere and maintaining an isothermal state for 0.1-3 hours.

In still another general aspect, there is provided a gas separation membrane (with the proviso that a membrane for use in flue gas separation is excluded) including a crosslinked thermally rearranged poly(benzoxazole-co-imide) having a repeating unit represented by the above Chemical Formula 1.

As used herein, flue gas means gas discharged from partial or complete combustion of hydrocarbon fuel and mostly contains carbon dioxide, water vapor and nitrogen. In some cases, flue gas is defined as a trace contaminant containing at least one of hydrogen, oxygen, carbon monoxide in addition to nitrogen oxides, sulfur oxide and microparticulate materials that may affect a change in environment of the earth. The present invention provides a gas separation membrane excluding membranes for use in flue gas separation, and a method for preparing the same.

In yet another general aspect, there is provided a method for preparing a gas separation membrane (with the proviso that a membrane for use in flue gas separation is excluded) including a crosslinked thermally rearranged poly(benzoxazole-co-imide) having a repeating unit represented by the above Chemical Formula 1, the method including the steps of:

i) reacting an acid dianhydride, ortho-hydroxydiamine and 3,5-diaminobenzoic acid as comonomer to obtain polyamic acid solution, and subjecting the polyamic acid solution to azeotropic thermal imidization to provide an ortho-hydroxypolyimide copolymer having a carboxylic acid;

ii) reacting the polyimide copolymer of step i) with a diol to obtain a monoesterified ortho-hydroxypolyimide copolymer;

iii) casting a polymer solution containing the monoesterified ortho-hydroxypolyimide copolymer of step ii) dissolved in an organic solvent to form a membrane, which in turn is subjected to transesterification crosslinking to obtain a crosslinked ortho-hydroxypolyimide copolymer membrane; and iv) carrying out thermal rearrangement of the crosslinked ortho-hydroxypolyimide copolymer membrane of step iii).

In general, it is required to react an acid dianhydride with diamine to obtain polyamic acid first in order to obtain polyimide. Thus, the method disclosed herein uses a compound represented by the following Chemical Formula 2 as an acid dianhydride:

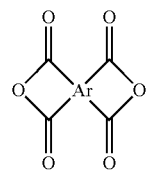

<Chemical Formula 2>

(In Chemical Formula 2, Ar is the same as defined in Chemical Formula 1).

Any compound represented by Chemical Formula 2 may be used as a monomer for preparing polyimide with no particular limitation. However, it is preferred to use 4,4'-hexafluoroisopropylidene phthalic dianhydride (6FDA) having a fluoride group in view of further improvement of the thermal and chemical properties of the resultant polyimide.

In addition, the target product of the method disclosed herein has a poly(benzoxazole-co-imide) structure. Thus, based on the fact that thermal rearrangement of ortho-hydroxy polyimide results in introduction of a polybenzoxazole unit, a compound represented by the following Chemical Formula 3 is used as ortho-hydroxydiamine to obtain ortho-hydroxy polyimide:

<Chemical Formula 3>

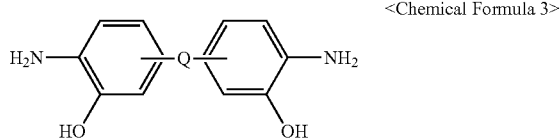

(In Chemical Formula 3, Q is the same as defined in Chemical Formula 1).

Any compound represented by Chemical Formula 3 may be used as ortho-hydroxydaimine. However, it is preferred to use 2,2-bis(3-amino-4-hydroxyphenyl)hexafluoropropane (bisAPAF) having a fluoride group in view of further improvement of the thermal and chemical properties of the resultant polyimide.

In addition, according to the method disclosed herein, 3,5-diaminobenzoic acid is used as comonomer er and allowed to react with the acid dianhydride of Chemical Formula 2 and ortho-hydroxy diamine of Chemical Formula 3 to provide an ortho-hydroxy polyimide copolymer having a carboxylic acid.

In other words, in step i), the acid dianhydride of Chemical Formula 2, ortho-hydroxy diamine of Chemical Formula 3 and 3,5-diaminobenzoic acid are dissolved and agitated in an organic solvent such as N-methylpyrrolidone (NMP) to obtain polyamic acid solution, which in turn is subjected to azeotropic thermal imidization to obtain an ortho-hydroxy polyimide copolymer having an carboxylic acid represented by the following General Formula 1:

<General Formula 1>

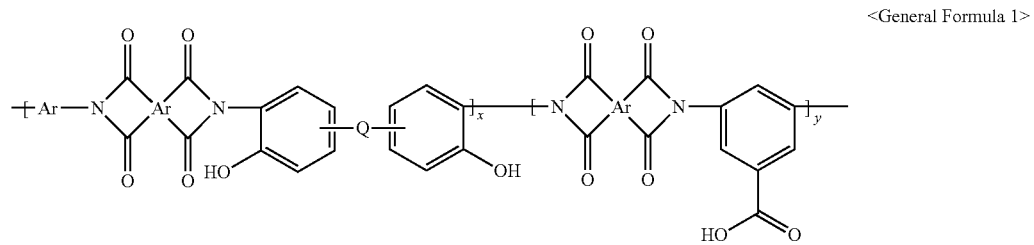

(In General Formula 1, Ar, Q, x and y are the same as defined in Chemical Formula 1).

Herein, the azeotropic thermal imidization is carried out by adding toluene or xylene to the polyamic acid solution and agitating the react on mixture to perform imidization at 180-200° C. for 6-12 hours. During the imidization, the water released while the imide ring is formed is separated as an azeotropic mixture of toluene or xylene.

Then, the polyimide copolymer of step i) is reacted with diol to obtain a monoesterified ortho-hydroxy polyimide copolymer represented by the following General Formula 2:

<General Formula 2>

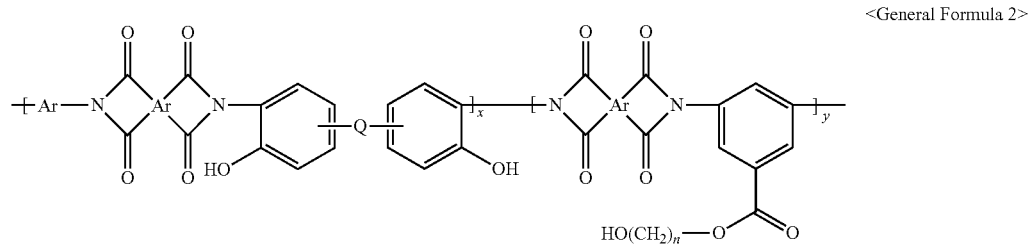

(In General Formula 2, Ar, Q, x and y are the same as defined in Chemical Formula 1).

Herein, any one selected from the group consisting of ethylene glycol, propylene glycol, 1,4-butylene glycol, 1,3-propanediol, 1,2-butanediol, 1,3-butanediol, and benzenedi methanol may be used as diol, and 1,4-butylene glycol is more preferred but is not limited thereto.

Then, the monoesterification of step ii) is carried out by reacting the copolymer of step i) with an excessive amount of diol corresponding to at least 50 times of the equivalent of carboxylic acid contained in the copolymer at 140-160° C. for 18-24 hours in the presence of a para-toluenesulfonic acid catalyst.

Then, a polymer solution containing the monoesterified ortho-hydroxypolyimide copolymer (General Formula 2) of step ii) dissolved in an organic solvent, such as N-methylpyrrolidone (NMP) is subjected to casting to form a membrane, which in turn is subjected to transesterification crosslinking to obtain a membrane of a crosslinked ortho-hydroxypolyimide copolymer represented by the following General Formula 3:

Hereinafter, particular embodiments of the methods for preparing a thermally rearranged poly(benzoxazole-co-imide) represented by Chemical Formula 1 and a gas separation membrane (with the proviso that a membrane for use in flue gas separation is excluded) including the same will be explained in more detail with reference to the accompanying drawings.

Example 1

Preparation of Ortho-hydroxy Polyimide Copolymer Having Carboxylic Acid

First, 9.5 mmol of 2,2-bis(3-amino-4-hydroxyphenyl) hexafluoropropane (bisAPAF) and 0.5 mmol of 3,5-diaminobenzoic acid (DABA) are dissolved into 10 ml of anhy-

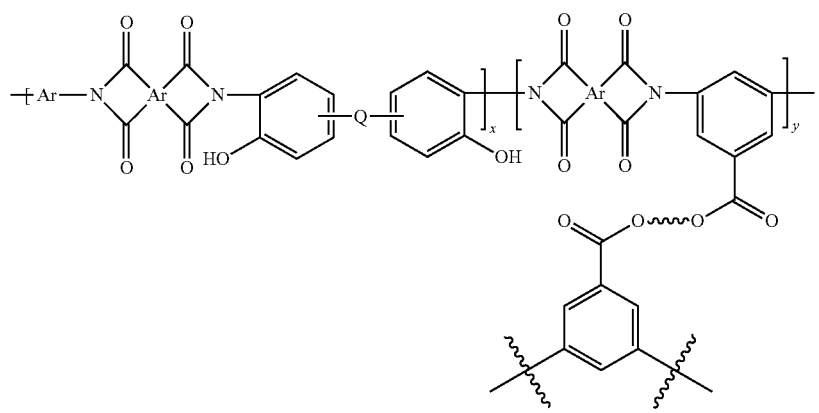

<General Formula 3>

(In General Formula 3, Ar, Q, x and y are the same as defined in Chemical Formula 1).

To carry out the transesterification crosslinking, the membrane is heat treated at 200-250° C. for 18-24 hours under vacuum.

Finally, the crosslinked ortho-hydroxypolyimide copolymer membrane represented by the following General Formula 3 is subjected to thermal rearrangement, thereby providing a gas separation membrane (with the proviso that a membrane for use in flue gas separation is excluded) including a crosslinked thermally rearranged poly(benzoxazole-co-imide) represented by Chemical Formula 1 as a final target product.

The thermal rearrangement is carried out by warming the membrane to 350-450° C. at a heating rate of 1-20° C./min under highly pure inert gas atmosphere and maintaining an isothermal state for 0.1-3 hours.

drous NMP and the resultant solution is cooled to 0° C. Next, 10 mmol of 4,4'-hexafluoroisoproplidene phthalic dianhydride (6FDA) dissolved in 10 ml of anhydrous NMP is added thereto. Then, the reaction mixture is agitated at 0° C. for 15 minutes, warmed to room temperature and allowed to stand overnight to obtain a viscous polyamic acid solution. In addition, 20 ml of ortho-xylene is added to the polyamic acid solution and stirred and agitated vigorously to carry out imidization at 180° C. for 6 hours. During this, water released by the formation of the imide ring is separated as an azeotropic mixture of xylene. Then, the brown colored solution thus obtained is cooled to room temperature, dipped into distilled water, washed with hot water several times, and dried in a convection oven at 120° C. for 12 hours. In this manner, the ortho-hydroxypolyimide copolymer having a carboxylic acid represented by the following Chemical Formula 4 is obtained, <Chemical Formula 4>

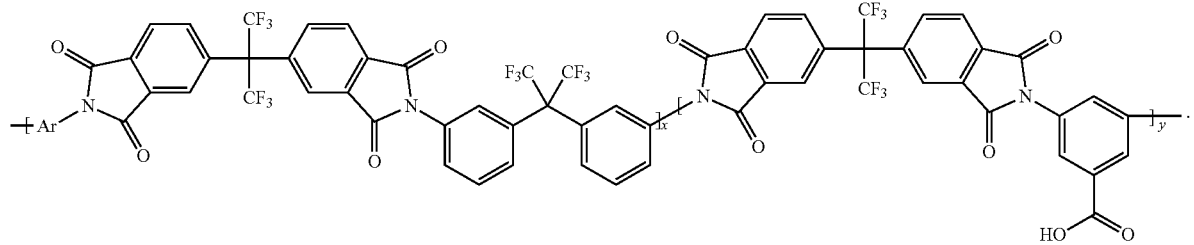

In Chemical Formula 4, each of x and y represents the molar fraction in the repeating unit, wherein x=0.95 and y=0.05.

Further, in Example 1, the amount of each reactant is varied. Particularly, bisAPAF is used in an amount of 9.0 mmol, 8.5 mmol and 8.0 mmol and DABA is used in an amount of 1.0 mmol, 1.5 mmol and 2.0 mmol, so that ortho-hydroxy polyimide copolymers having carboxylic acids with different molar fractions x and y in the repeating unit are provided. The resultant products are designated as HPIDABA-Y (Y represents the molar fraction (percent) of DABA diamine introduced to the repeating unit).

Then, it is confirmed from the following $^1$H-NMR and FT-IR data that the ortho-hydroxy polyimide copolymer having a carboxylic acid is obtained from Example 1. $^1$H-NMR (300 MHz, DMSO-d$_6$, ppm): 13.50 (s, —COOH), 10.41 (s, —OH), 8.10 (d, H$_{ar}$, ° C. J=8.0 Hz), 7.92 (d, H$_{ar}$, J=8.0 Hz), 7.85 (s, H$_{ar}$), 7.80 (s, H$_{ar}$), 7.71 (s, H$_{ar}$), 7.47 (s, H$_{ar}$), 7.20 (d, H$_{ar}$, J=8.3 Hz), 7.04 (d, H$_{ar}$, J=8.3 Hz). FT-IR (film): ν(O—H) at 3400 cm$^{-1}$, ν(C=O) at 1786 and 1716 cm$^{-1}$, Ar (C—C) at 1619, 1519 cm$^{-1}$, imide ν(C—N) at 1377 cm$^{-1}$, (C—F) at 1299-1135 cm$^{-1}$, imide (C—N—C) at 1102 and 720 cm$^{-1}$.

Example 2

Preparation of Monoesterified Ortho-Hydroxy Polyimide Copolymer

In a three-neck flask equipped with a condenser, 1.0 g of HPIDABA obtained from Example 1 is dissolved into 10 ml of NMP while carrying out nitrogen purging continuously. To the resultant solution, an excessive amount of 1,4-butylene glycol corresponding to at least 50 times of the equivalent of carboxylic acid is added. Then, under nitrogen atmosphere, 5 mg of para-toluenesulfonic acid catalyst is added and monoesterification is carried out at 140° C. for 18 hours. After the completion of the monoesterification, the resultant copolymer solution is cooled to room temperature, dipped into distilled water, washed several times to remove unreacted 1,4-butylene glycol, and dried in a vacuum at 70° C. for 24 hours. In this manner, a monoesterified ortho-hydroxypolyimide copolymer represented by the following Chemical Formula 5 is obtained.

In Chemical Formula 5, x and y are the same as defined in Chemical Formula 4.

In addition, monoesterified ortho-hydroxy polyimide copolymers having a different molar fraction y ranging from 5% to 20% (0.05 to 0.2) are prepared in the same manner as Example 1, and are designated as HPIBG-Y (Y represents the molar fraction (percent) of GABA diamine introduced to the repeating unit).

Then, it is confirmed from the following $^1$H-NMR and FT-IR data that the monoesterified ortho-hydroxy polyimide copolymer represented by Chemical Formula 5 is obtained from Example 2. $^1$H-NMR (300 MHz, DMSO-d$_6$, ppm): 10.41 (s, —OH), 8.10 (d, H$_{ar}$, J=8.0 Hz), 7.92 (d, H$_{ar}$, J=8.0 Hz), 7.85 (s, H$_{ar}$), 7.80 (s, H$_{ar}$), 7.71 (s, H$_{ar}$), 7.47 (s, H$_{ar}$), 7.20 (d, H$_{ar}$, J=8.3 Hz), 7.04 (d, H$_{ar}$, J=8.3 Hz), 4.25 (m, CH$_2$OCO), 1.75 (m, CH$_2$), 1.50 (m, CH$_2$). FT-IR (film): ν(O—H) at 3400 cm$^{-1}$, aliphatic (C—H) at 2980 and 2898 cm$^{-1}$, ν(C=O) at 1786 and 1716 cm$^{-1}$, Ar (C—C) at 1619 and 1519 cm$^{-1}$, imide ν(C—N) at 1377 cm$^{-1}$, (C—F) at 1299-1135, imide (C—N—C) at 1102 and 720 cm$^{-1}$.

Example 3

Preparation of Crosslinked Ortho-Hydroxy Polyimide Copolymer (Membrane

HPIBG-Y obtained from Example 2 is dissolved into NMP to provide a solution with a concentration of 15 wt %, which in turn is cast onto a glass plate. The resultant product is introduced to a vacuum oven and warmed gradually to 250° C. to remove NMP while maintaining the temperature at 100° C., 150° C. and 200° C., each for 1 hour. Then, the copolymer film is heat treated at 250° C. for 24 hours under vacuum to carry out transesterification crosslinking, thereby providing a membrane of crosslinked orthohydroxy polyimide copolymer represented by the following Chemical Formula 6. The resultant membrane is designated as XHPI-Y (Y represents the molar fraction (percent) of DABA diamine introduced to the repeating unit).

<Chemical Formula 5>

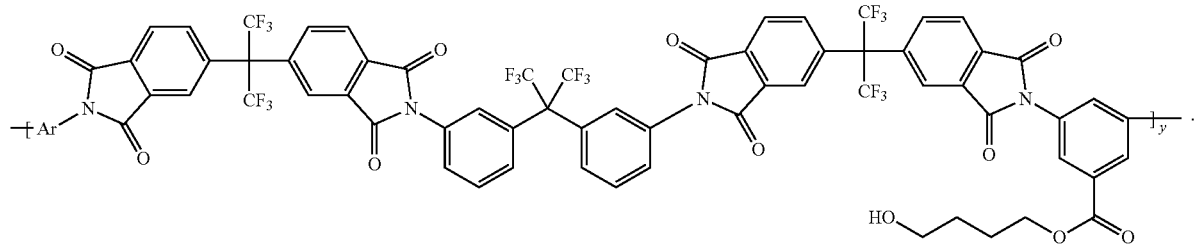

<Chemical Formula 6>

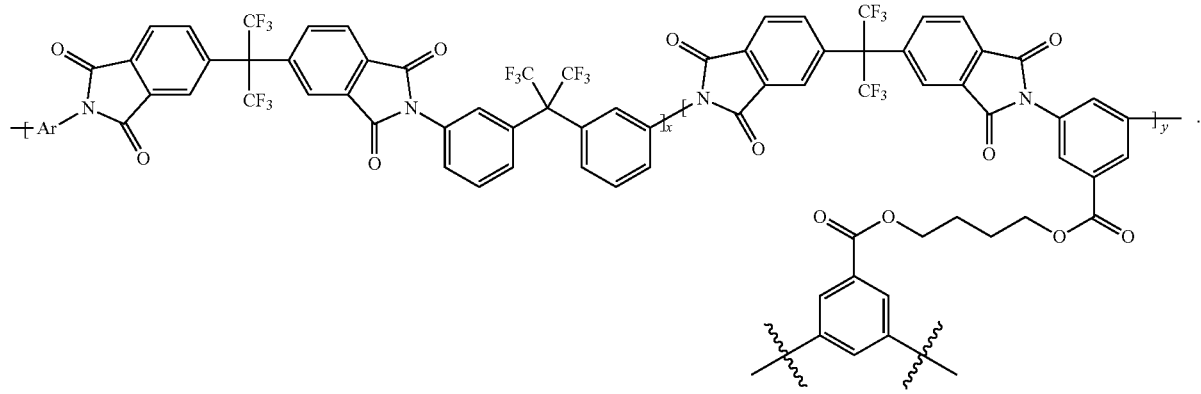

In Chemical Formula 6, x and y are the same as defined in Chemical Formulae 4 and 5.

Example 4

Preparation of Thermally Rearranged Poly(Benzoxazole-Co-Imide) (Membrane

The flawless film obtained from Example 3 is cut into a size of 3 cm×3 cm and placed between two quartz plates to prevent its deformation caused by an increase in temperature in a muffle furnace. The sample is warmed to 450° C. at a heating rate of 5° C./min and maintained in an isothermal state for 1 hour. After the heat treatment, the muffle furnace is cooled to room temperature gradually at a cooling rate less than 10° C./min to provide a membrane of crosslinked thermally rearranged poly(benzoxazole-co-imide) represented by the following Chemical Formula 7. The membrane is designated as XTR-PBOI-Y (Y represents the molar fraction (percent) of DABA diamine introduced to the repeating unit).

that 10 mmol of bisAPAF and 10 mmol of 6FDA are used alone as reactants with no use of BABA, and designated as HPI.

Comparative Example 21

Preparation of Thermally Rearranged Polybenzoxazole Homopolymer Membrane

HPI obtained from Comparative Example 1 is heat treated in the same manner as Example 4 to provide a membrane of non-crosslinked thermally rearranged polybenzoxazole homopolymer, and the membrane is designated as TR-PBO.

FIG. 1 shows $^1$H-NMR spectrum for evaluating the degree of esterification of HPIBG-15 among the monoesterified ortho-hydroxy polyimide copolymers obtained from Example 2. The conversion from carboxylic acid into ester is calculated from the ratio of area of signal appearing at ~4.5 ppm corresponding to aromatic hydrogen, $CH_2OCO$ group of the hydroxybutyl ester moiety as compared with the theoretical ratio in the case of complete conversion into <Chemical Formula 7>

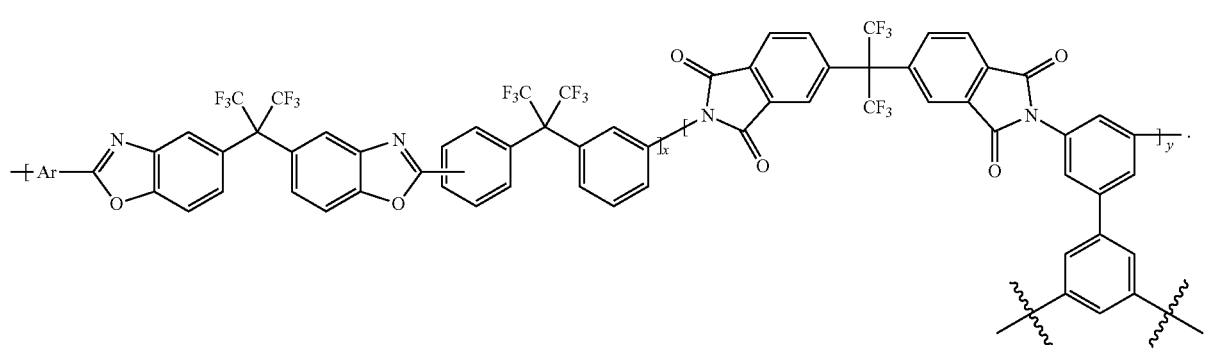

In Chemical Formula 7, x and y are the same as defined in Chemical Formulae 4-6.

Comparative Example 1

Preparation of Ortho-hydroxy Polyimide Homopolymer Homopolymer

A carboxylic acid-free ortho-hydroxy polyimide homopolymer is prepared in the same manner as Example 1, except ester. The monoesterified ortho-hydroxy polyimide copolymers are evaluated as providing a degree of esterification up to about 100%.

Figure 2:
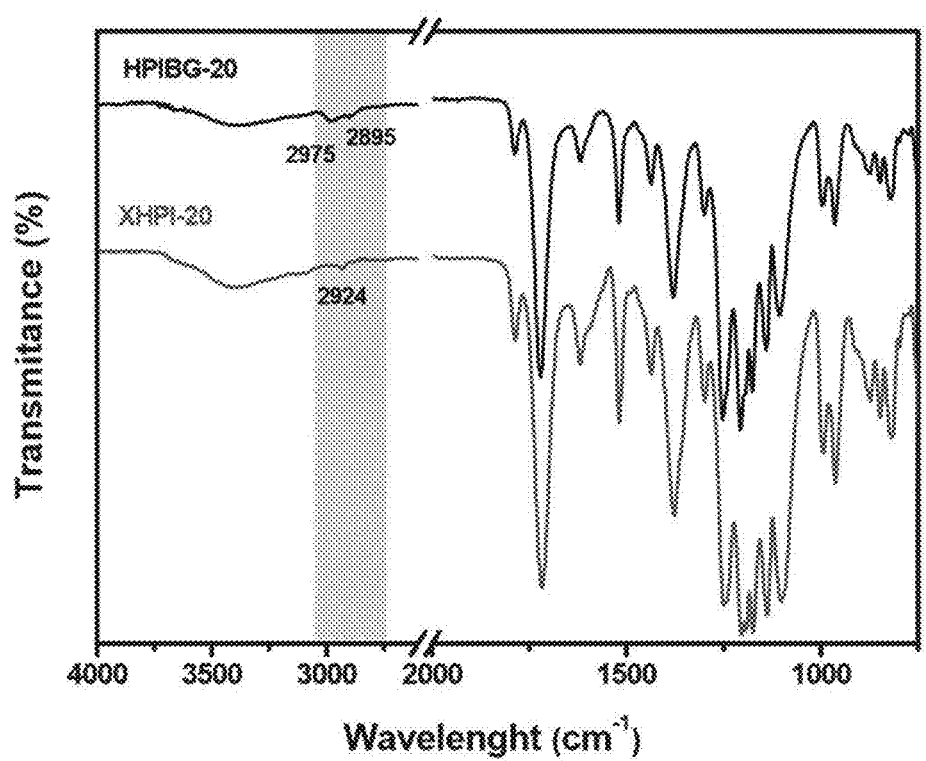
FIG. 2 shows ATR-FTIR (Attenuated Total Reflection-Fourier Transform Infrared) spectra of HPIBG-20 obtained according to Example 2 and XHPI-20 obtained according to Example 3.

FIG. 2 shows the ATR-FTIR spectrum of HPIBG-20 of the monoesterified ortho-hydroxy polyimide copolymers obtained from Example 2 and that of XHPI-20 of the crosslinked ortho-hydroxy polyimide copolymers. As shown in FIG. 2, a low absorption band caused by aliphatic C—H stretching of the butylene moiety can be seen in a region of 2980-2900 cm$^{-1}$, it can be seen that transesterification crosslinking is carried out as determined from a decrease in absorption peak of XHPI-20 as compared to HPIBG-20. In addition to the spectra of the samples as shown in FIG. 2, ATR-FTIR spectra of the other samples (HPIBG-5, HPIBG-10, HPIBG-15, XHPI-5, XHPI-10 and XHPI-15) having different molar fractions of DABA diamine according to Examples 2 and 3 demonstrate that the intensity of such a decreased peak increases as the molar ratio (molar fraction of DABA diamine) increases.

Figure 3:
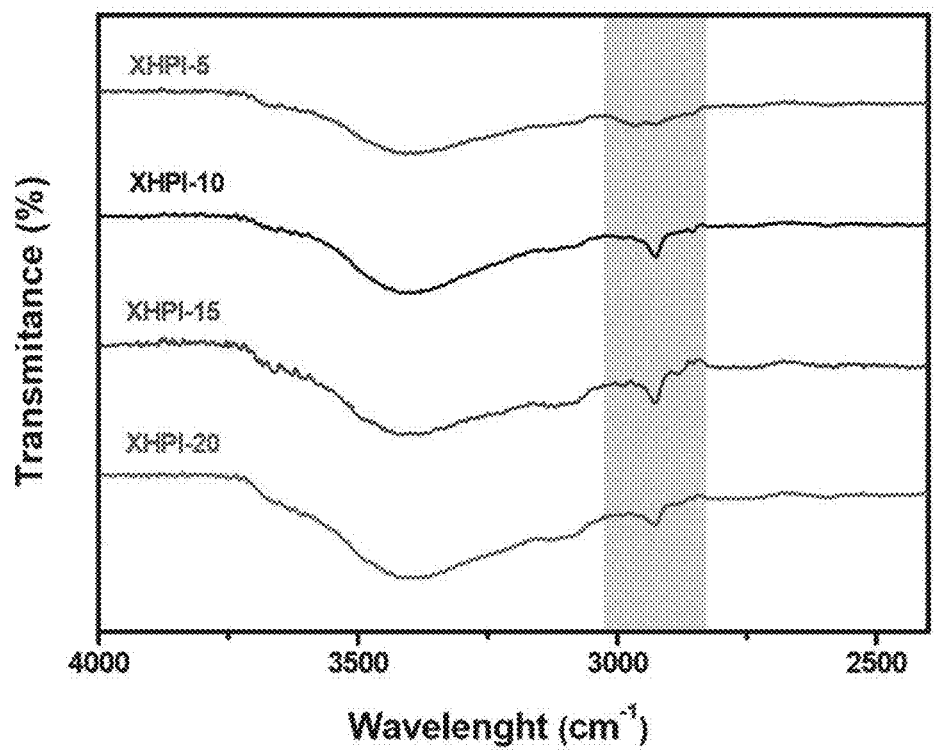
FIG. 3 shows an ATR-FTIR spectrum of the XPHI-Y obtained according to Example 3.

Further, FIG. 3 shows ATR-FTIR spectrum of XHPI-Y, the crosslinked ortho-hydroxy polyimide copolymer obtained from Example 3. As shown in FIG. 3, it can be seen from a decrease in absorption peak in a region of 2980-2900 cm$^{-1}$ caused by aliphatic C—H stretching of the butylene moiety that transesterification esterification is carried out. In addition, in the case of a solubility test, XHPI-5 having a relatively low degree of crosslinking is soluble partially in an organic solvent, but XHPI-10, XHPI-15 and XHPI-20 are hardly soluble in an organic solvent, suggesting that they have a high degree of crosslinking. Moreover, when HPI obtained from Comparative Example 1 is subjected to a solubility test after the heat treatment thereof under vacuum at 250° C. for 24 hours in the same manner as Example 4, it is soluble in NMP easily at room temperature, and this also supports the above results.

Figure 4:
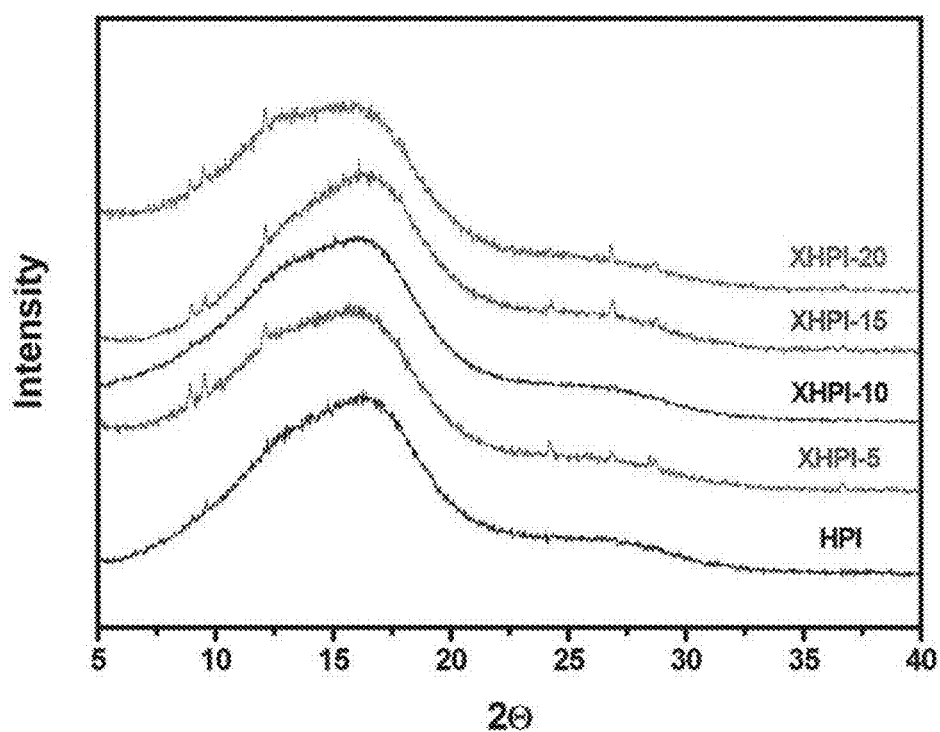
FIG. 4 shows WAXD (Wide Angle X-ray Diffraction) patterns of the XHPI-Y obtained according to Example 3, and the sample obtained by heat treating the HPI prepared from Comparative Example 1 at 250° C. for 24 hours in the same manner as Example 3.

FIG. 4 shows WAXD (Wide Angle X-ray Diffraction) patterns of BHPI-Y (crosslinked ortho-hydroxy polyimide copolymers obtained from Example 3) and the sample of HPI obtained from Comparative Example 1 after the heat treatment thereof under vacuum at 250° C. for 24 hours in the same manner as Example 3. A broad amorphous band appears in all of the samples. In the case of XHPI-Y having a different degree of crosslinking, it can be seen that the peak amorphous band shows little change in its position from approximately 16° (2θ) as compared to non-crosslinked HPI, although each band shows a minute difference in its shape and width.

Figure 5:
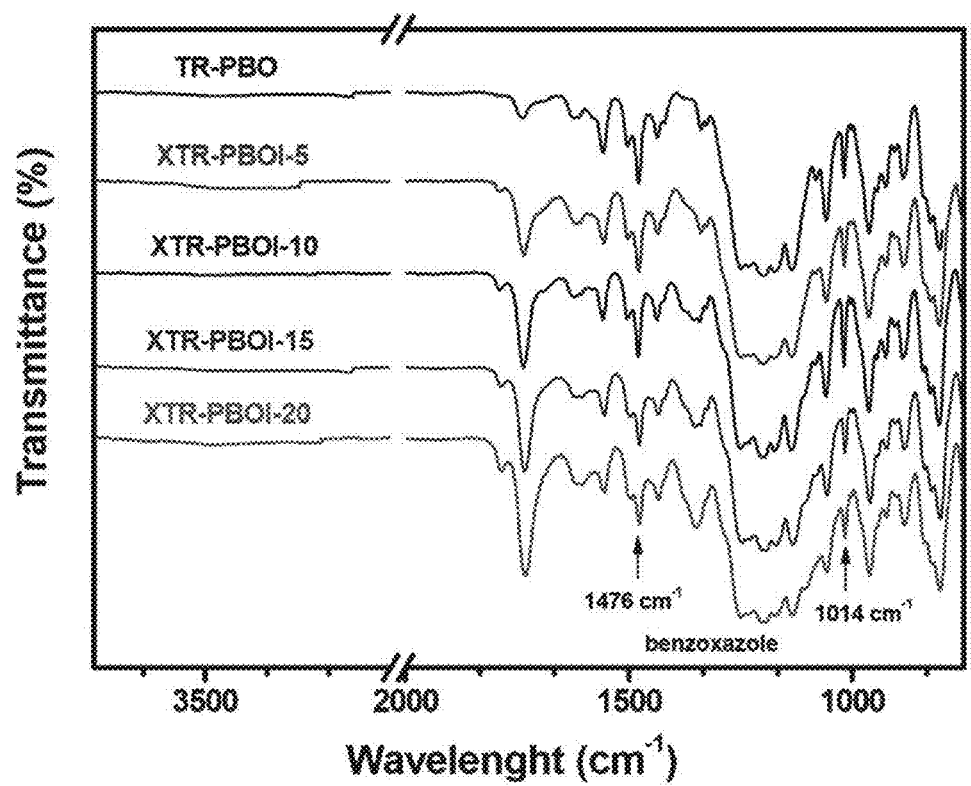
FIG. 5 shows ATR-FTIR spectra of the XTR-PBOI-Y obtained according to Example 4 and TR-TBG obtained according to Comparative Example 2.

FIG. 5 shows ATR-FTIR spectrum of XTR-PBOI-Y (thermally rearranged poly(benzoxazole-co-imide) obtained from Example 4) and that of TR-PBO (thermally rearranged polybenzoxazole homopolymer obtained from Comparative Example 2). The O—H stretching peak at near 3400 cm$^{-1}$ disappears, and two distinct peaks appear at near 1480 cm$^{-1}$ and 1060 cm$^{-1}$ due to a typical benzoxazole ring, suggesting that a benzoxazole ring is formed. Further, XTR-PBOI-Y also shows an absorption band unique to an imide group, suggesting that the aromatic imide linking group is thermally stable even at a thermal rearrangement temperature up to 450° C.

Figure 6:
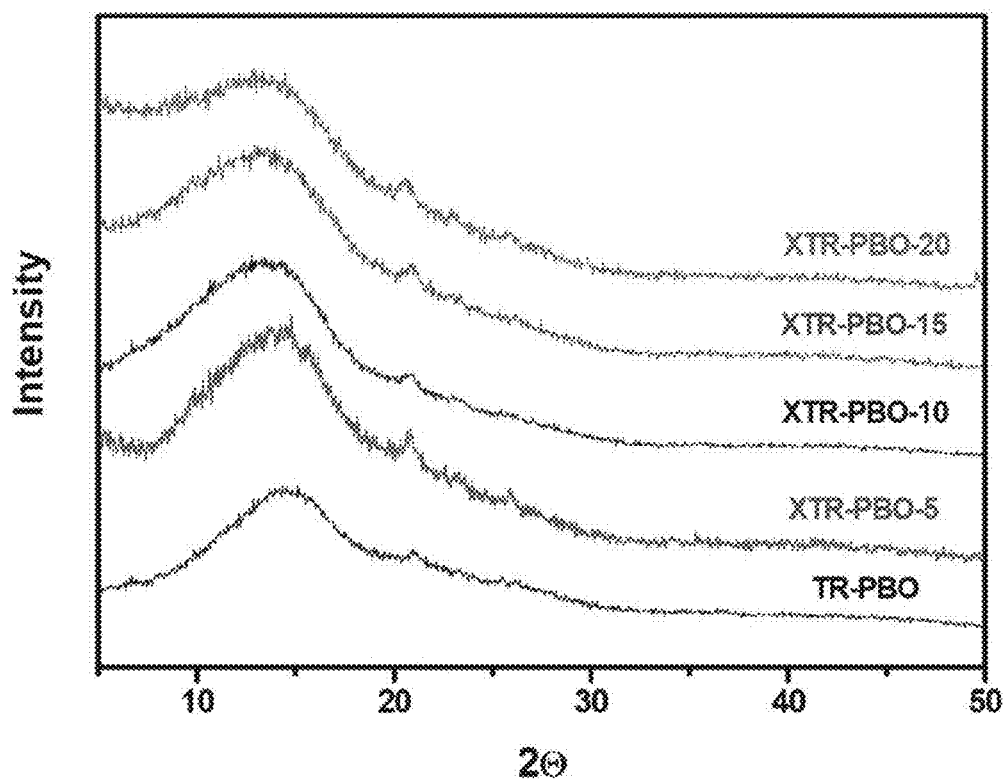
FIG. 6 shows WAXD (Wide Angle X-ray Diffraction) patterns of the XTR-PBOI-Y obtained according to Example 4 and TR-PBO obtained according to Comparative Example 2.

FIG. 6 shows WAXD patterns of XTR-PBOI-Y (thermally rearranged poly(benzoxazole-co-imide) obtained from Example 4) and that of TR-PBO (thermally rearranged polybenzoxazole homopolymer obtained from Comparative Example 2). It can be seen that the average interchain spacing significantly increases, as compared with the pattern (FIG. 4) of XHPI-Y (copolymer before thermal rearrangement). Meanwhile, as shown in FIG. 6, the width and position of the band of XTR-PBOI-Y is significantly different from those of TR-PBO. Particularly, the maximum peak of TR-PBO shows a shift toward the right side (2θ=15°), suggesting that the average intersegmental spacing is shorter. In other words, TR-PBO obtained from Comparative Example 2 shows a narrower amorphous band, and thus cannot contribute to elongation of the intersegmental spacing. On the other hand, XTR-PBOI-Y obtained from Example 4 has a crosslinked structure, and thus lowers the chain packing density and elongates the intersegmental spacing.

In addition, the following Table 1 shows the density and interplanar spacing (d-spacing) of each of the samples obtained according to Examples 3 and 4 and Comparative Examples 1 and 2 (calculated values using Bragg's equation based on the WAXD patterns of FIG. 4 and FIG. 6). The interplanar spacing of XTR-PBOI-Y obtained from Example 4 is 0.62-0.67 nm, which is longer as compared to XHPI-Y (0.54-0.57 nm) obtained from Example 3. It can be seen from the above result that the average interchain spacing increases significantly. This also corresponds with a significant drop in density of XTR-PBOI-Y (1.36-1.43 g/cm$^3$) as compared to the density (1.50-1.52 g/cm$^3$) of XHPI-Y.

TABLE 1

| Sample | Density (g/cm$^3$) | d-spacing (nm) |
| --- | --- | --- |
| XHPI-5 | 1.51 | 0.55 |
| XHPI-10 | 1.52 | 0.55 |
| XHPI-15 | 1.51 | 0.54 |
| XHPI-20 | 1.50 | 0.57 |
| XTR-PBOI-5 | 1.43 | 0.62 |
| XTR-PBOI-10 | 1.41 | 0.66 |
| XTR-PBOI-15 | 1.39 | 0.67 |
| XTR-PBOI-20 | 1.36 | 0.66 |
| HPI | 1.53 | 0.57 |
| TR-PBO | 1.38 | 0.58 |

Therefore, XTR-PBOI-Y obtained according to the present invention allows less packing of polymer chains and has a structure with a larger space, and thus shows increased possibility of permeation and diffusion of small molecules therethrough. Thus, it may be applied as a gas separation membrane.

Figure 7:
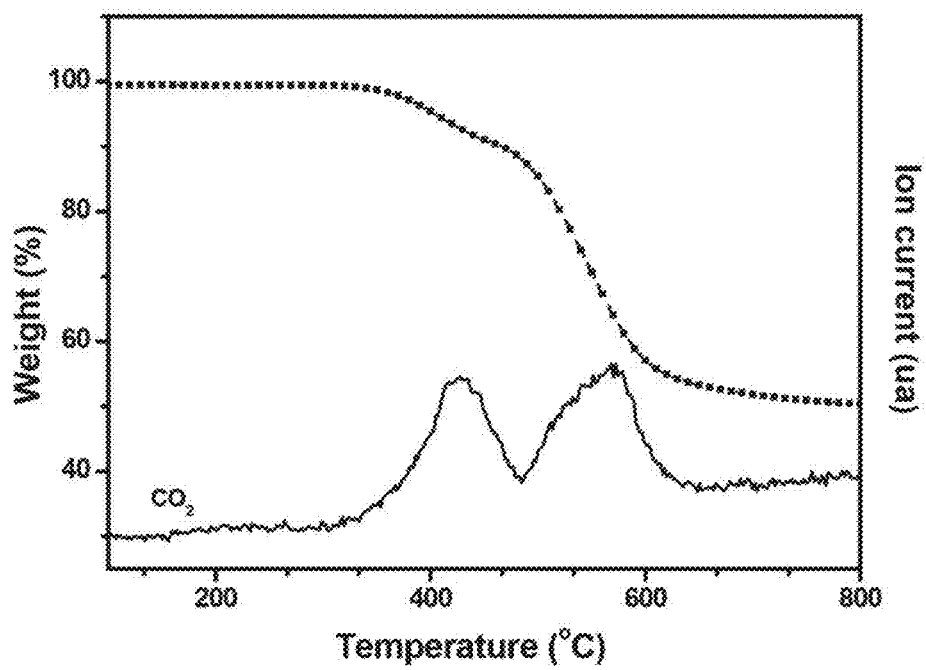
FIG. 7 is a graph of TG-MS (Thermogravimetry-Mass Spectrometry) illustrating a weight decrease in thermogravimetric characteristics of the XPHI-20 obtained according to Example 3.
Figure 8:
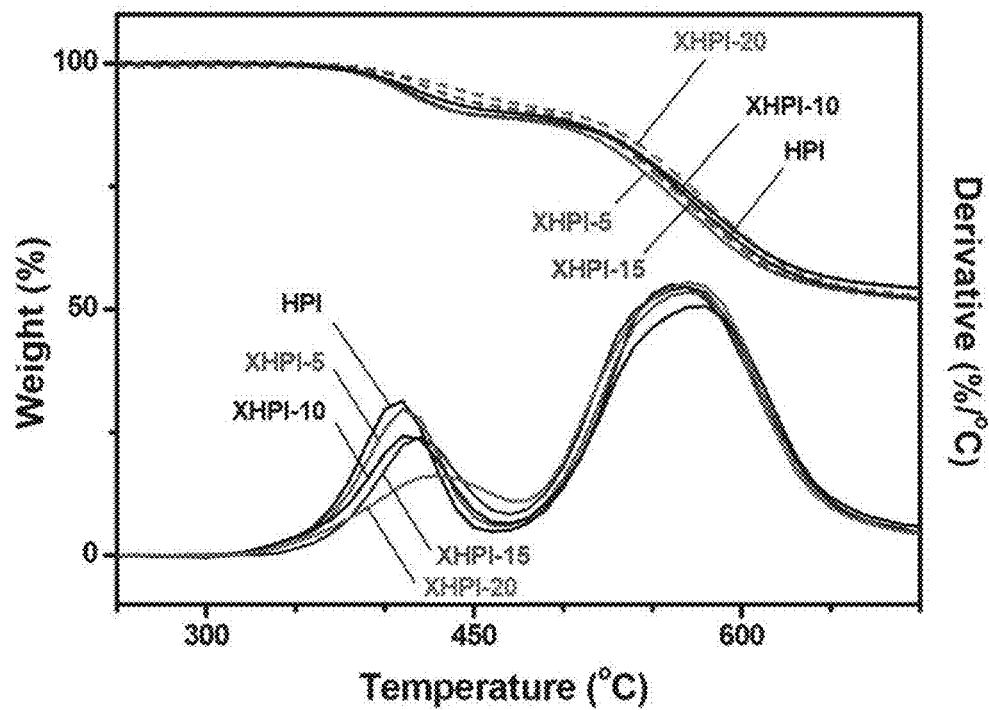
FIG. 8 shows the TGA (Thermogravimetric Analysis) and DTG (Derivative TG) graphs of the XPHI obtained according to Example 3.

In addition, Thermogravimetric analysis (TGA) is carried out to test a decrease in weight caused by the decarboxylation during the preparation of thermally rearranged polybenzoxazole from XHPI-Y and HPI obtained according to Example 3 and Comparative Example 1. FIG. 7 (test result only for XHPI-20) and FIG. 8 show the test results. The following Table 2 shows other thermal properties including a change in glass transition temperature.

FIG. 7 shows a distinct weight decrease peak at 300-400° C. prior to 500-600° C. that is a general decomposition temperature of a polymer chain. Mass spectrometry demonstrates that $CO_2$ is released during the first weight decrease step, suggesting that a thermal rearrangement process is accomplished. In addition, it can be seen from FIG. 8 that the thermal rearrangement temperature of XHPI-Y is affected by the movability of polymer chain depending on the degree of crosslinking. This is also confirmed from the behaviors of a change in glass transition temperature and a change in temperature at the maximum thermal conversion into PBO depending on the degree of crosslinking, as shown in the following Table 2.

TABLE 2

| Sample | $Tg^a$ (° C.) | $T_{TR}^b$ (° C.) | $r_{TR}^c$ (wt %/° C.) | $CO_2$ weight decrease$^d$ (%) | $CO_2$ weight decrease$^e$ (%) |
| --- | --- | --- | --- | --- | --- |
| HPI | 300 | 407 | 0.1920 | 11.36 | 11.25 |
| XHPI-5 | 305 | 412 | 0.1815 | 10.79 | 10.94 |
| XHPI-10 | 305 | 414 | 0.1499 | 10.22 | 9.94 |

TABLE 2-continued

| Sample | $Tg^a$ (°C.) | $T_{TR}^b$ (°C.) | $r_{TR}^c$ (wt %/°C.) | $CO_2$ weight decrease$^d$ (%) | $CO_2$ weight decrease$^e$ (%) |
|---|---|---|---|---|---|
| XHPI-15 | 311 | 419 | 0.1461 | 9.66 | 9.42 |
| XHPI-20 | 320 | 429 | 0.0985 | 9.09 | 8.62 |

$^a$Mid-point of endothermic transition as scanned secondarily in DSC at a heating rate of 20° C./min under nitrogen atmosphere
$^b$Maximum weight decrease point or temperature at the maximum thermal conversion into PBO
$^c$Maximum conversion from imide into benzoxazole
$^d$Theoretical value of $CO_2$ weight decrease corresponding to thermal rearrangement
$^e$Found value of $CO_2$ weight decrease corresponding to the first stage as determined by TGA In addition, XTR-PBOI-5. XTR-PBOI-10 and XTR-PBOI-15 among the membranes XTR-PBOI-Y of crosslinked thermally rearranged poly(benzoxazole-co-imide) obtained according to Example 4, and non-crosslinked TR-PBO membrane according to Comparative Example 1 are subjected to PALS (Positron Annihilation Lifetime Spectroscopy) to carry out quantitative analysis about the free volume size and distribution of each membrane. The results are shown in the following Table 3 and FIG. 9.

TABLE 3

| Sample | $\tau_3$ (ns) | $I_3$ (%) | $\tau_4$ (ns) | $I_4$ (%) | Pore diameter $d_3$ (Å) | Pore diameter $d_4$ (Å) |
|---|---|---|---|---|---|---|
| TR-PBO | 1.075 ± 0.135 | 7.271 ± 1.030 | 3.678 ± 0.054 | 13.955 ± 0.679 | 3.56 ± 0.84 | 8.22 ± 0.12 |
| XTR-PBOI-5 | 1.178 ± 0.121 | 6.389 ± 0.591 | 3.972 ± 0.061 | 12.391 ± 0.463 | 3.86 ± 0.34 | 8.45 ± 0.07 |
| XTR-PBOI-10 | 1.267 ± 0.133 | 6.111 ± 0.570 | 4.217 ± 0.060 | 11.432 ± 0.421 | 4.11 ± 0.36 | 8.71 ± 0.06 |
| XTR-PBOI-15 | 1.238 ± 0.122 | 5.708 ± 0.560 | 4.353 ± 0.067 | 9.825 ± 0.434 | 4.03 ± 0.33 | 8.86 ± 0.07 |

As can be seen from Table 3, XTR-PBOI-Y (membranes of crosslinked thermally rearranged poly(benzoxazole-co-imide) obtained from Example 4 has two types of o-Ps components, i.e., $\tau_3$ and $\tau_4$, and this means that the membrane has two types of pores. After carrying out PALS analysis, it can be seen that the membrane has ultrafine pores of $\tau_3$~1.2 ns corresponding to $d_3$ average pore diameter of 4 Å and fine pores of $\tau_4$~4 ns corresponding to $d_4$ average pore diameter of 8.6 Å. The pore diameters are larger than the average pore diameter of TR-PBO obtained from Comparative Example 1.

Figure 9:
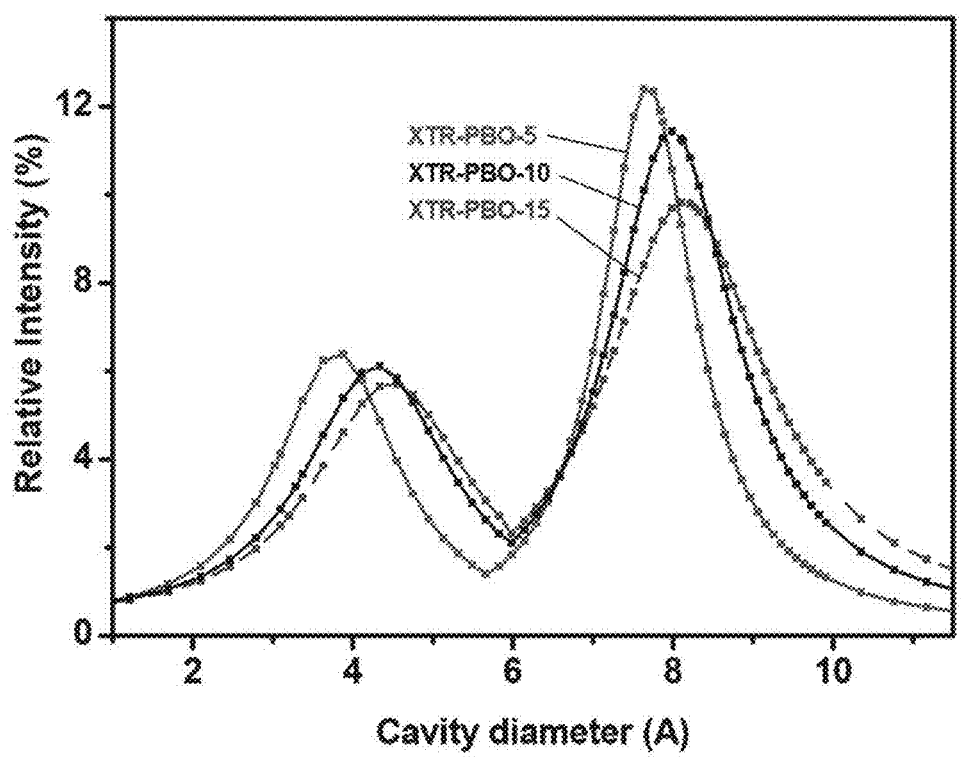
FIG. 9 shows a free volume distribution chart as determined by PALS (Positron Annihilation Lifetime Spectroscopy) of the XTR-PBOI-5, XTR-PBOI-10 and XTR-PBOI-15 obtained according to Example 4.

Further, FIG. 9 shows the free volume distribution of each of the membranes XTR-PBOI-5, XTR-PBOI-10 and XTR-PBOI-15 according to Example 4 as determined by PALS. The two peaks at near 4 Å and 8 Å undergo a shift toward larger pores depending on the degree of crosslinking, which corresponds with the PALS data as shown in Table 3.

In addition, to determine the gas separation quality of each of the membranes of crosslinked thermally rearranged poly(benzoxazole-co-imide) according to Example 4 and the TR-PBO membrane according to Comparative Example 1, permeability and selectivity are measured for various gases and the results are shown in the following Tables 4 and 5 and FIG. 10.

TABLE 4

| Sample | Gas permeability (barrer)$^a$ | | | | | |
|---|---|---|---|---|---|---|
| | He | $H_2$ | $CO_2$ | $O_2$ | $N_2$ | $CH_4$ |
| TR-PBO | 269 | 294 | 261 | 52.5 | 12.6 | 7.5 |
| XTR-PBOI-5 | 446 | 603 | 746 | 133 | 29.6 | 19.9 |
| XTR-PBOI-10 | 517 | 763 | 980 | 193 | 50.9 | 33.0 |

TABLE 4-continued

| Sample | Gas permeability (barrer)$^a$ | | | | | |
|---|---|---|---|---|---|---|
| | He | $H_2$ | $CO_2$ | $O_2$ | $N_2$ | $CH_4$ |
| XTR-PBOI-15 | 404 | 515 | 668 | 119 | 29.8 | 19.4 |
| XTR-PBOI-20 | 345 | 421 | 440 | 81.9 | 19.7 | 12.4 |

$^a$1 barrer = $10^{-10}$ $cm^3$(STP) cm/(s $cm^2$ cmHg)

TABLE 5

| Sample | Selectivity$^b$ | | | | | |
|---|---|---|---|---|---|---|
| | $O_2/N_2$ | $CO_2/N_2$ | $CO_2/CH_4$ | $CO_2/H_2$ | $H_2/CH_4$ | $N_2/CH_4$ |
| TR-PBO | 4.2 | 20.7 | 34.8 | 0.9 | 39.2 | 1.7 |
| XTR-PBOI-5 | 4.5 | 25.2 | 37.5 | 1.2 | 30.3 | 1.5 |
| XTR-PBOI-10 | 3.8 | 19.3 | 29.7 | 1.3 | 23.1 | 1.5 |

TABLE 5-continued

| Sample | Selectivity$^b$ | | | | | |
|---|---|---|---|---|---|---|
| | $O_2/N_2$ | $CO_2/N_2$ | $CO_2/CH_4$ | $CO_2/H_2$ | $H_2/CH_4$ | $N_2/CH_4$ |
| XTR-PBOI-15 | 4.0 | 22.4 | 34.4 | 1.3 | 26.5 | 1.5 |
| XTR-PBOI-20 | 4.2 | 22.3 | 35.5 | 1.0 | 34.0 | 1.6 |

$^b$Selectivity means the ratio of permeability of one gas to that of the other gas.

It can be seen from Tables 4 and 5 that the permeability and selectivity of the XTR-PBOI-Y membrane (crosslinked thermally rearranged poly(benzoxazole-co-imide) according to Example 4) are higher than those of the non-crosslinked TR-PBO membrane according to Comparative Example 1. In general it is known that the gas permeation characteristics of a vitrified polymer largely depend on the distribution and size of free volume factors. It is demonstrated that the permeability coefficient of the XTR-PBOI-Y membrane is larger than that of the TR-PBO membrane. This also corresponds with the results of PALS suggesting that the XTR-PBOI-Y membrane has pores with a larger size.

The XTR-PBOI-Y membrane according to the present invention has excellent selectivity as well as high permeability, and thus overcomes a general trade-off relationship between permeability and selectivity. Particularly, in the case of a $CO_2/CH_4$ mixed gas, it can be seen that a high level of selectivity is maintained while providing a significantly high $CO_2$ permeability up to 980 barrer.

Figure 10:
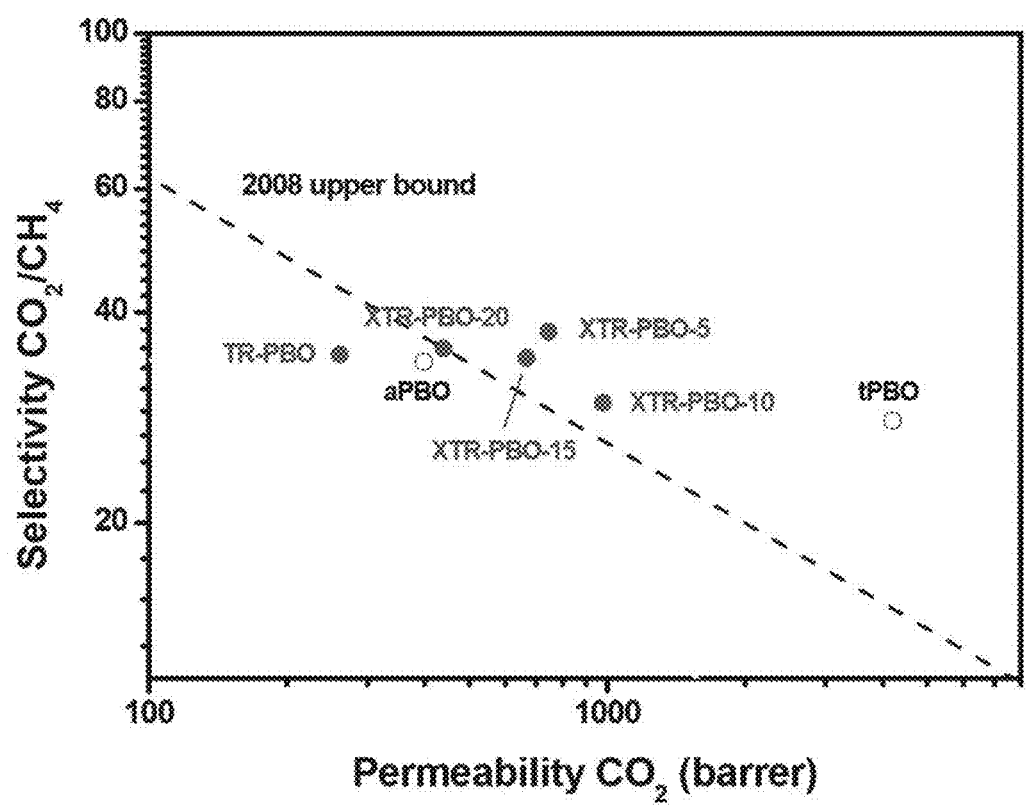
FIG. 10 is a graph illustrating the relationship between $CO_2$ permeability and $CO_2/CH_4$ selectivity of the XTR-PBOI-Y membranes obtained according to Example 4 together with the 2008 upper bound.

It can be seen from FIG. 10 that the XTR-PBOI-Y membrane (crosslinked thermally rearranged poly(benzoxazole-co-imide) obtained according to the present invention) provides gas separation quality corresponding to a level exceeding the so-called 2008 upper bound.

While the present invention has been described with respect to the specific embodiments, it will be apparent to those skilled in the art that various changes and modifications may be made without departing from the spirit and scope of the invention as defined in the following claims.

What is claimed is:

1. A crosslinked thermally rearranged poly(benzoxazole-co-imide) having a repeating unit represented by the following Chemical Formula 1:

<Chemical Formula 1>

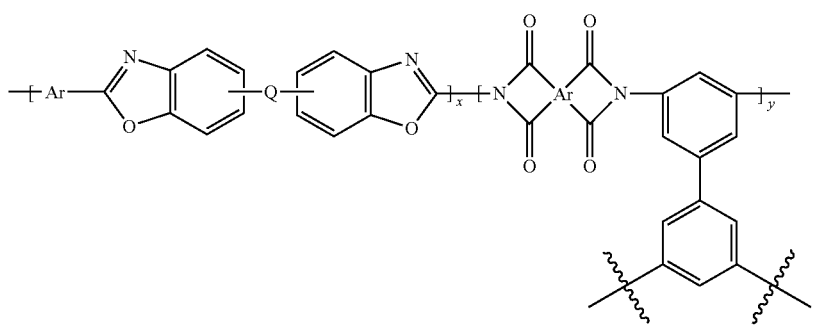

wherein, in Chemical Formula 1, Ar is an aromatic cyclic group selected from substituted or non-substituted tetravalent C6-C24 arylene groups and substituted or non-substituted tetravalent C4-C24 heterocyclic groups, wherein the aromatic cyclic group is present alone; two or more of the aromatic cyclic groups form a condensed ring together; two or more of the aromatic cyclic groups are linked to each other via O, S, CO, $SO_2$, $Si(CH_3)_2$, $(CH_2)_p$ (1≤P≤10), $(CF_2)_q$ (1≤q≤10), $C(CH_3)_2$, $C(CF_3)_2$ or CO—NH, Q is a single bond; or O, S, CO, $SO_2$, $Si(CH_3)_2$, $(CH_2)_p$ (1≤P≤10), $(CF_2)_q$ (1≤q≤10), $C(CH_3)_2$, $C(CF_3)_2$, CO—NH, $C(CH_3)(CF_3)$, or a substituted or non-substituted phenylene group, and each of x and y represents a molar fraction in the repeating unit, wherein 0.8≤x≤0.95, 0.05≤y≤0.2 and x+y=1.

2. The crosslinked thermally rearranged poly(benzoxazole-co-imide) according to claim 1, which has an interplanar spacing (d-spacing) of 0.62-0.67 nm.

3. The crosslinked thermally rearranged poly(benzoxazole-co-imide) according to claim 1, which has a density of 1.36-1.43 g/cm³.

4. A method for preparing a crosslinked thermally rearranged poly(benzoxazole-co-imide) having a repeating unit represented by the above Chemical Formula 1 of claim 1, the method comprising the steps of:

i) reacting an acid dianhydride, ortho-hydroxydiamine and 3,5-diaminobenzoic acid as comonomer to obtain polyamic acid solution, and subjecting the polyamic acid solution to azeotropic thermal imidization to provide an ortho-hydroxypolyimide copolymer having a carboxylic acid;

ii) reacting the polyimide copolymer of step i) with a diol to obtain a monoesterified ortho-hydroxypolyimide copolymer;

iii) subjecting the monoesterified ortho-hydroxypolyimide copolymer of step ii) to transesterification crosslinking to obtain a crosslinked ortho-hydroxypolyimide copolymer; and iv) carrying out thermal rearrangement of the crosslinked ortho-hydroxypolyimide copolymer of step iii).

5. The method for preparing a crosslinked thermally rearranged poly(benzoxazole-co-imide) having a repeating unit represented by the above Chemical Formula 1 according to claim 4, wherein the acid dianhydride used in step i) is represented by the following Chemical Formula 2:

<Chemical Formula 2>

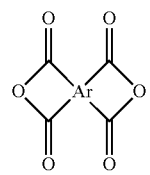

wherein, in Chemical Formula 2, Ar is the same as defined in Chemical Formula 1.

6. The method for preparing a crosslinked thermally rearranged poly(benzoxazole-co-imide) having a repeating unit represented by the above Chemical Formula 1 according to claim 4, wherein the ortho-hydroxydiamine used in step i) is represented by the following Chemical Formula 3:

<Chemical Formula 3>

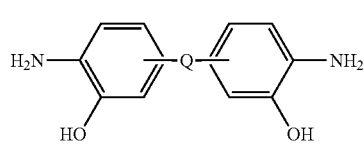

wherein, in Chemical Formula 3, Q is the same as defined in Chemical Formula 1.

7. The method for preparing a crosslinked thermally rearranged poly(benzoxazole-co-imide) having a repeating unit represented by the above Chemical Formula 1 according to claim 4, wherein the azeotropic thermal imidization of step i) is carried out by adding toluene or xylene to the polyamic acid solution and agitating the reaction mixture to perform imidization at 180-200° C. for 6-12 hours.

8. The method for preparing a crosslinked thermally rearranged poly(benzoxazole-co-imide) having a repeating unit represented by the above Chemical Formula 1 according to claim 4, wherein the diol used in step ii) is any one selected from the group consisting of ethylene glycol, propylene glycol, 1,4-butylene glycol, 1,3-propanediol, 1,2-butanediol, 1,3-butanediol, and benzenedimethanol.

9. The method for preparing a crosslinked thermally rearranged poly(benzoxazole-co-imide) having a repeating unit represented by the above Chemical Formula 1 according to claim 4, wherein the monoesterification of step ii) is carried out by reacting the copolymer of step i) with an excessive amount of diol corresponding to at least 50 times of the equivalent of carboxylic acid contained in the copolymer at 140-160° C. for 18-24 hours in the presence of a para-toluenesulfonic acid catalyst.

10. The method for preparing a crosslinked thermally rearranged poly(benzoxazole-co-imide) having a repeating unit represented by the above Chemical Formula 1 according to claim 4, wherein the transesterification crosslinking of step iii) is carried out through heat treatment at 200-250° C. for 18-24 hours under vacuum.

11. The method for preparing a crosslinked thermally rearranged poly(benzoxazole-co-imide) having a repeating unit represented by the above Chemical Formula 1 according to claim 4, wherein the thermal rearrangement of step iv) is carried out by warming the crosslinked ortho-hydroxy polyimide copolymer to 350-450° C. at a heating rate of 1-20° C./min under highly pure inert gas atmosphere and maintaining an isothermal state for 0.1-3 hours.

12. A method for separating a non-flue gas comprising contacting a gas separation membrane with a non-flue gas, wherein the gas separation membrane comprises the crosslinked thermally rearranged poly(benzoxazole-co-imide) as defined in claim 1.

13. The method for separating a non-flue gas according to claim 12, which has a $d_3$ average pore diameter of 4.0 Å and a $d_4$ average pore diameter of 8.6 Å.

14. The method for separating a non-flue gas, with the proviso that a membrane for use in flue gas separation is excluded, as defined in claim 12, comprising the steps of:
  i) reacting an acid dianhydride, ortho-hydroxydiamine and 3,5-diaminobenzoic acid as comonomer to obtain polyamic acid solution, and subjecting the polyamic acid solution to azeotropic thermal imidization to provide an ortho-hydroxypolyimide copolymer having a carboxylic acid;
  ii) reacting the polyimide copolymer of step i) with a diol to obtain a monoesterified ortho-hydroxypolyimide copolymer;
  iii) casting a polymer solution containing the monoesterified ortho-hydroxypolyimide copolymer of step ii) dissolved in an organic solvent to form a membrane, which in turn is subjected to transesterification crosslinking to obtain a crosslinked ortho-hydroxypolyimide copolymer membrane; and
  iv) carrying out thermal rearrangement of the crosslinked ortho-hydroxypolyimide copolymer membrane of step iii).

15. The method for separating a non-flue gas, with the proviso that a membrane for use in flue gas separation is excluded, according to claim 14, wherein the acid dianhydride used in step i) is represented by the following Chemical Formula 2:

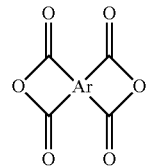

<Chemical Formula 2> wherein, in Chemical Formula 2, Ar is the same as defined in Chemical Formula 1.

16. The method for separating a non-flue gas, with the proviso that a membrane for use in flue gas separation is excluded, according to claim 14, wherein the ortho-hydroxydiamine used in step i) is represented by the following Chemical Formula 3:

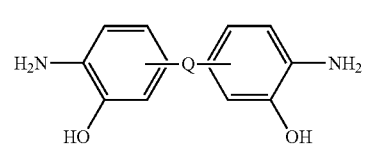

<Chemical Formula 3> wherein, in Chemical Formula 3, Q is the same as defined in Chemical Formula 1.

17. The method for separating a non-flue gas, with the proviso that a membrane for use in flue gas separation is excluded, according to claim 14, wherein the azeotropic thermal imidization of step i) is carried out by adding toluene or xylene to the polyamic acid solution and agitating the reaction mixture to perform imidization at 180-200° C. for 6-12 hours.

18. The method for separating a non-flue gas, with the proviso that a membrane for use in flue gas separation is excluded, according to claim 14, wherein the diol used in step ii) is any one selected from the group consisting of ethylene glycol, propylene glycol, 1,4-butylene glycol, 1,3-propanediol, 1,2-butanediol, 1,3-butanediol, and benzenedimethanol.

19. The method for separating a non-flue gas, with the proviso that a membrane for use in flue gas separation is excluded, according to claim 14, wherein the monoesterification of step ii) is carried out by reacting the copolymer of step i) with an excessive amount of diol corresponding to at least 50 times of the equivalent of carboxylic acid contained in the copolymer at 140-160° C. for 18-24 hours in the presence of a para-toluenesulfonic acid catalyst.

20. The method for separating a non-flue gas, with the proviso that a membrane for use in flue gas separation is excluded, according to claim 14, wherein the transesterification crosslinking of step iii) is carried out through heat treatment at 200-250° C. for 18-24 hours under vacuum.

21. The method for separating a non-flue gas, with the proviso that a membrane for use in flue gas separation is excluded, according to claim 14, wherein the thermal rearrangement of step iv) is carried out by warming the membrane to 350-450° C. at a heating rate of 1-20° C./min under highly pure inert gas atmosphere and maintaining an isothermal state for 0.1-3 hours.

* * * * *